United States Patent
Ogishima et al.

(10) Patent No.: US 9,077,737 B2
(45) Date of Patent: Jul. 7, 2015

(54) WIRELESS COMMUNICATION SYSTEM, INFORMATION AND COMMUNICATION TERMINAL, PORTABLE TELEPHONE, READER/WRITER, COMMUNICATION METHOD AND COMPUTER PROGRAM

(75) Inventors: Jun Ogishima, Tokyo (JP); Shuichi Sekiya, Saitama (JP); Takeshi Takeuchi, Tokyo (JP); Osamu Sato, Kanagawa (JP); Toyokazu Ota, Tokyo (JP); Shigeki Wakasa, Kanagawa (JP); Daisuke Shiigi, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 815 days.

(21) Appl. No.: 11/980,878

(22) Filed: Oct. 31, 2007

(65) Prior Publication Data

US 2008/0259830 A1  Oct. 23, 2008

(30) Foreign Application Priority Data

Nov. 8, 2006  (JP) ................................. 2006-303320

(51) Int. Cl.
*H04B 7/00* (2006.01)
*H04L 29/08* (2006.01)
(Continued)

(52) U.S. Cl.
CPC ............... *H04L 67/14* (2013.01); *H04W 28/04* (2013.01); *H04W 28/06* (2013.01); *H04W 88/02* (2013.01); *H04L 69/327* (2013.01)

(58) Field of Classification Search
USPC .......... 455/550.1, 422.1, 41.1–41.3; 370/474, 370/252, 338, 389, 278, 282, 328, 329, 473, 370/477
See application file for complete search history.

(56) References Cited

U.S. PATENT DOCUMENTS 5,528,621 A    6/1996  Heiman et al.
5,596,318 A *  1/1997  Mitchell ..................... 340/7.22
(Continued)

FOREIGN PATENT DOCUMENTS

CN    1856948    11/2006
JP   58 56200     4/1983
(Continued)

OTHER PUBLICATIONS

ECMA International: "Near Field Communication Interface and Protocol (NFCIP-1)" Internet Citation, [Online] Dec. 2004, XP002451218 Retrieved from the Internet: URL:http://www.ecma-international.org/publications/files/ECMA-ST/Ecma-340.pd [retrieved on Sep. 17, 2007].

(Continued)

*Primary Examiner* — Edward Urban
*Assistant Examiner* — Rui Hu
(74) *Attorney, Agent, or Firm* — Frommer Lawrence & Haug LLP; William S. Frommer

(57) ABSTRACT

There is provided a wireless communication system that includes two information communication terminals with built-in IC chips engaged in alternating wireless communication with each other through noncontact communication, wherein one of the information communication terminals includes a reception unit that receives a packet originating from the other information communication terminal, a transmission unit that wirelessly transmits a single packet or a plurality of packets to the other information communication terminal by transmitting all packets that can be transmitted to the other information communication terminal instead of engaging in alternating wireless communication if a specific condition is satisfied and an identifier appending unit that appends a last packet identifier to a packet to be transmitted last from the transmission unit among all the packets that can be transmitted to the other information communication terminal.

11 Claims, 10 Drawing Sheets

(51) Int. Cl.
  *H04W 28/04* (2009.01)
  *H04W 28/06* (2009.01)
  *H04W 88/02* (2009.01)

(56) References Cited

U.S. PATENT DOCUMENTS

| | | | |
|---|---|---|---|
| 6,310,892 B1* | 10/2001 | Olkin | 370/473 |
| 6,389,016 B1* | 5/2002 | Sabaa et al. | 370/389 |
| 6,563,813 B1* | 5/2003 | Coveley | 370/349 |
| 7,116,683 B1* | 10/2006 | Petersen et al. | 370/474 |
| 7,701,975 B1* | 4/2010 | Tsang et al. | 370/474 |
| 7,990,859 B2* | 8/2011 | Ishii et al. | 370/230 |
| 2001/0007562 A1* | 7/2001 | Matsuoka et al. | 370/415 |
| 2002/0126710 A1* | 9/2002 | Bergenwall et al. | 370/535 |
| 2002/0172208 A1* | 11/2002 | Malkamaki | 370/400 |
| 2005/0053095 A1 | 3/2005 | Kato et al. | |
| 2005/0237992 A1* | 10/2005 | Mishra et al. | 370/349 |
| 2005/0265391 A1* | 12/2005 | Bartfai et al. | 370/474 |
| 2006/0149963 A1 | 7/2006 | Lu et al. | |
| 2007/0030831 A1 | 2/2007 | Majima | |
| 2008/0062944 A1* | 3/2008 | Smith et al. | 370/342 |
| 2008/0069046 A1* | 3/2008 | Ishii et al. | 370/330 |
| 2008/0069067 A1* | 3/2008 | Sood et al. | 370/342 |

FOREIGN PATENT DOCUMENTS

| | | |
|---|---|---|
| JP | 3 242781 | 10/1991 |
| JP | 7 264262 | 10/1995 |
| JP | 2002 77204 | 3/2002 |
| WO | WO2005/109787 * | 11/2005 |
| WO | WO 2006 035331 | 4/2006 |

OTHER PUBLICATIONS

ISO/IEC FCD 14443-4: ISO/IEC 14443-4 Identification cards—Contactless integrated circuit(s) cards—Proximity cards—Part 4: "Transmission protocol" ISO/IEC JTC1/SC17 N1689, Mar. 10, 2000, pp. 1-33, XP002347585.

* cited by examiner

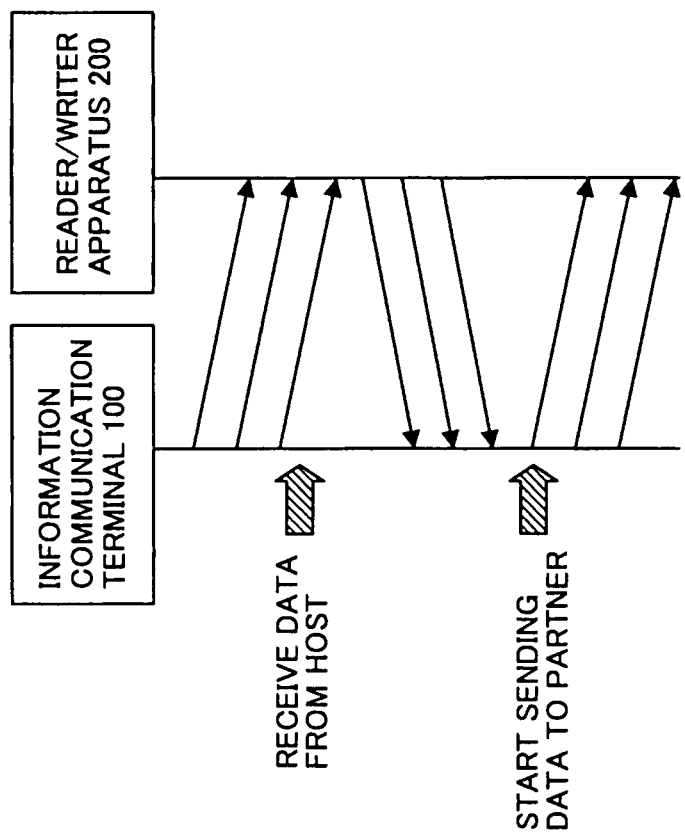
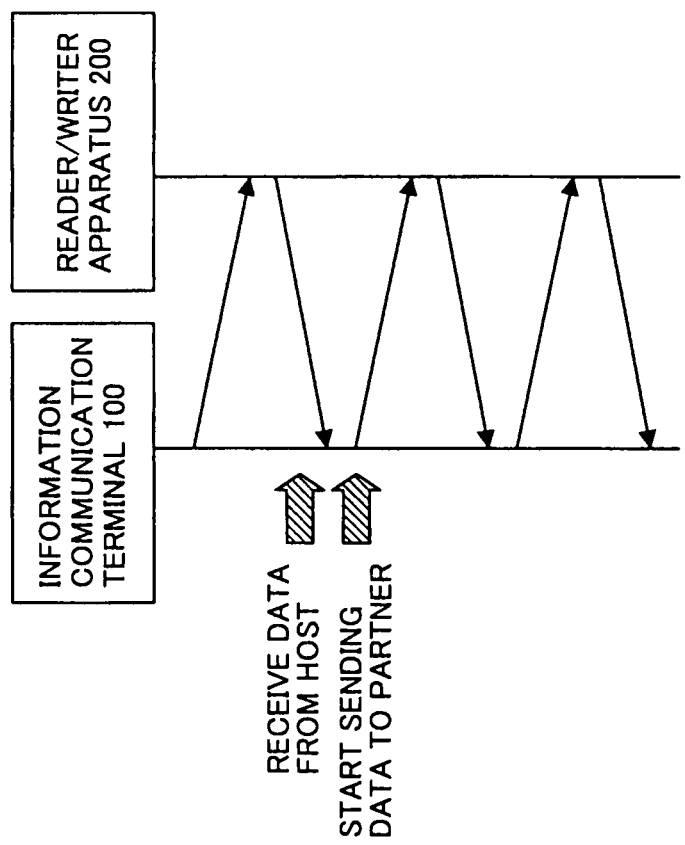

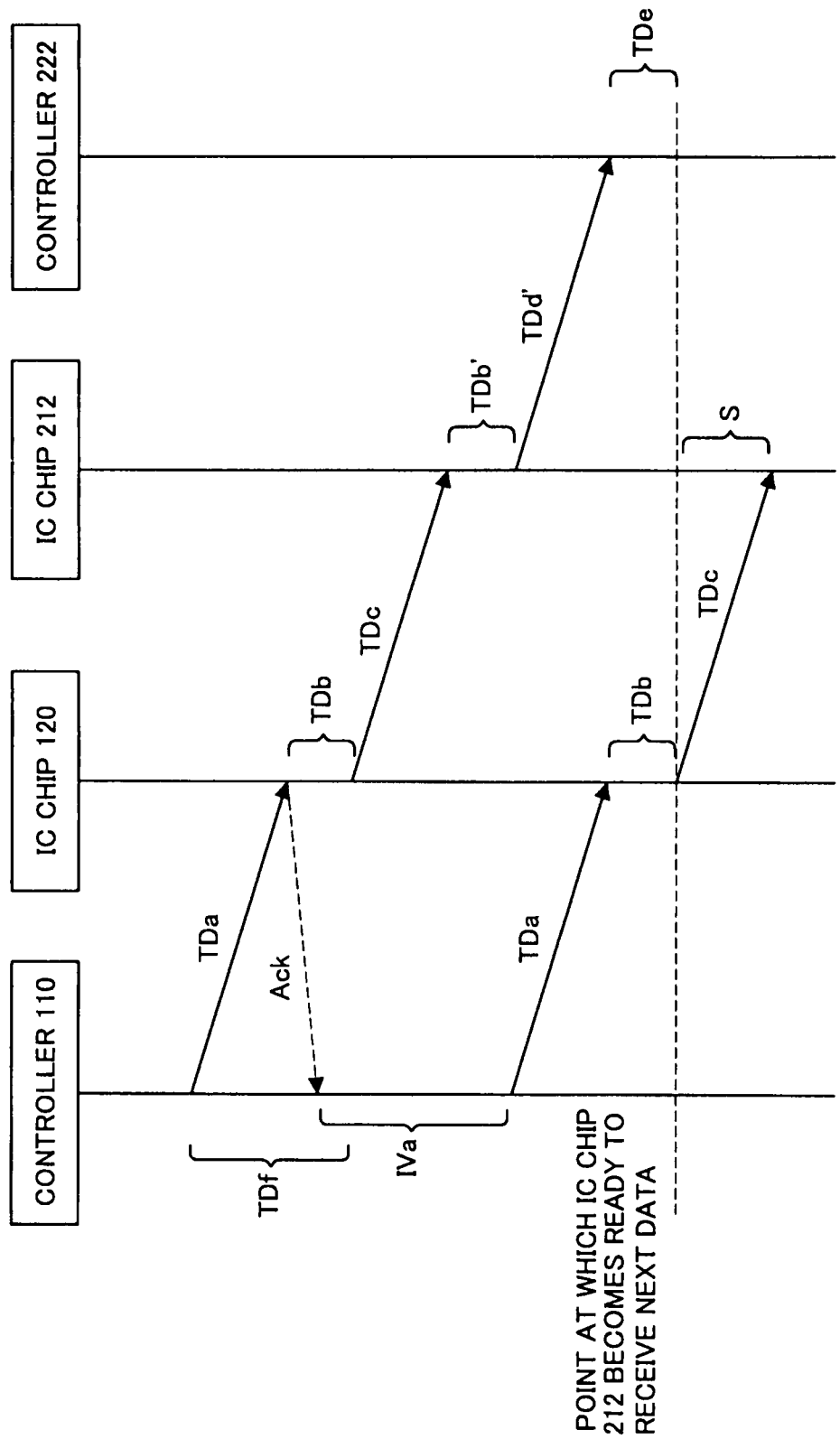

WIRELESS COMMUNICATION SYSTEM, INFORMATION AND COMMUNICATION TERMINAL, PORTABLE TELEPHONE, READER/WRITER, COMMUNICATION METHOD AND COMPUTER PROGRAM

CROSS REFERENCE TO RELATED APPLICATION

The present invention contains subject matter related to Japanese Patent Application JP 2006-303320 filed in the Japan Patent Office on Nov. 8, 2006, the entire contents of which being incorporated herein by reference.

BACKGROUND OF THE INVENTION

1. Field of the Invention

The present invention relates to a wireless communication system, an information communication terminal, a portable telephone, a reader/writer, a communication method and a computer program.

2. Description of the Related Art

Information communication terminals such as portable telephones and cards, with embedded IC chips having recorded therein information, are widely used in noncontact wireless communication carried out with reader/writer (R/W) terminals. In particular, such information communication terminals with IC chips embedded therein are commonly utilized for check-in processing at access points to boarding areas in public transportation systems, for payment processing at retail cashiers, for credit card bill settlement processing and for employee time-clock recording and the like.

In the related art, an information communication terminal with an embedded IC chip is engaged in wireless communication with an R/W terminal through a half-duplex communication system whereby the information communication terminal and the R/W terminal each transmit and receive a single packet in response to a command issued by a controller that controls the IC chip.

SUMMARY OF THE INVENTION

However, there is an issue to be addressed with regard to the wireless communication executed in the related art in that each terminal receives and transmits a single set of data in response to a given command, data transmission cannot be executed efficiently if many sets of data need to be transmitted.

Accordingly, the present invention, having been achieved by addressing the issue of the related art discussed above, provides a new and improved wireless communication system, a new and improved information communication terminal, a new and improved portable telephone, a new and improved reader/writer, a new and improved communication method and a new and improved computer program, affording improved wireless communication efficiency through continuous transmission of a single packet or continuous batch transmission of a plurality of packets.

According to an embodiment of the present invention, there is provided a wireless communication system that includes two information communication terminals with built-in IC chips engaged in alternating wireless communication with each other through noncontact communication. One of the information communication terminals includes a reception unit that receives a packet originating from the other information communication terminal, a transmission unit that wirelessly transmits a single packet or a plurality of packets to the other information communication terminal by transmitting all packets that can be transmitted to the other information communication terminal instead of engaging in alternating wireless communication if a specific condition is satisfied and an identifier appending unit that appends a last packet identifier to a packet to be transmitted last from the transmission unit among all the packets that can be transmitted to the other information communication terminal.

At the information communication terminal adopting the structure described above, the reception unit receives a packet originating from the other information communication terminal, the transmission unit wirelessly transmits a single packet or a plurality of packets in a batch continuously to the other information communication terminal and the identifier appending unit appends the last packet identifier to the single packet to be transmitted or to the last packet among the plurality of packets to be transmitted from the transmission unit. As a result, since a plurality of packets can be transmitted through a single transmission, the noncontact communication enabled by using IC chips can be speeded up. In addition, based upon the identifier appended to the last packet among the packets transmitted continuously in a batch, the subject information communication terminal is able to switch from the transmission-in-progress state to a reception-in-progress state and the other information communication terminal, i.e., the communication partner, is able to switch from the reception-in-progress state to a transmission-in-progress state.

According to another embodiment of the present invention, there is provided an information communication terminal that engages in alternating wireless communication with another information communication terminal through noncontact communication achieved by using IC chips, comprising a reception unit that receives a packet originating from the other information communication terminal, a transmission unit that wirelessly transmits a single packet or a plurality of packets to the other information communication terminal and transmits all packets that can be transmitted to the other information communication terminal instead of engaging in alternating wireless communication if a specific condition is satisfied and an identifier appending unit that appends a last packet identifier to a packet to be transmitted last from the transmission unit among all the packets that can be transmitted to the other information communication terminal.

The structure described above enables the reception unit to receive a packet originating from the other information communication terminal, the transmission unit to wirelessly transmit a single packet or a plurality of packets in a batch continuously to the other information communication terminal and the identifier appending unit to append the last packet identifier to the single packet to be transmitted or to the last packet among the plurality of packets to be transmitted from the transmission unit and identifier indicating that it is the last packet. As a result, since a plurality of packets transmitted can be through a single transmission, the noncontact communication enabled by using IC chips can be speeded up. In addition, based upon the identifier appended to the last packet among the packets transmitted continuously in a batch, the subject information communication terminal is able to switch from the transmission-in-progress state to a reception-in-progress state and the other information communication terminal, i.e., the communication partner, is able to switch from the reception-in-progress state to a transmission-in-progress state.

The information communication terminal may further include a storage unit in which parameters related to the information communication terminal are stored. At the time of a communication start, it may exchange the parameters with the other information communication terminal and determine the number of packets to be transmitted continuously in a batch based upon a parameter. Alternatively, it may exchange parameters with the other information communication terminal at the communication start to determine the volume of data to be transmitted continuously in a batch based upon a parameter.

The information communication terminal may be a portable telephone or it may be a reader/writer apparatus.

According to another embodiment of the present invention, there is provided a wireless communication method that enables alternating wireless communication with another information communication terminal through noncontact communication achieved by using IC chips, comprising a reception step in which a packet from the other information communication terminal is received, a transmission step in which a single packet or a plurality of packets are wirelessly transmitted by transmitting all packets that can be transmitted to the other information communication terminal instead of engaging in alternating wireless communication if a specific condition is satisfied and an identifier appending step in which a last packet identifier is appended to a packet to be transmitted last among all the packets that can be transmitted to the other information communication terminal through the transmission step.

According to another embodiment of the present invention, there is provided a computer program that enables alternating wireless communication with another information communication terminal through noncontact communication achieved by using IC chips, enabling a computer to execute processing that includes a transmission step in which a single packet or a plurality of packets are transmitted by transmitting all packets that can be transmitted to the other information communication terminal instead of engaging in alternating wireless communication if a specific condition is satisfied and an identifier appending step in which a last packet identifier is appended to a packet to be transmitted last among all the packets that can be transmitted to the other information communication terminal through the transmission step.

According to another embodiment of the present invention, there is provided a wireless communication system that includes two information communication terminals with built-in IC chips engaged in alternating wireless communication with each other through noncontact communication. One of the information communication terminals includes a transmission unit that transmits a plurality of packets continuously in a batch, a storage unit in which communication-related information corresponding to the subject information communication terminal is stored, a reception unit that receives communication-related information corresponding the other information communication terminal, i.e., a communication partner, when communication is established and an interval calculation unit that calculates a transmission interval with which the plurality of packets are to be transmitted by the transmission unit based upon the communication-related information corresponding to the subject information communication terminal stored in the storage unit and the communication-related information corresponding to the communication partner information communication terminal received by the reception unit.

At the information communication terminal adopting the structure described above, the transmission unit transmits a plurality of packets continuously in a batch, the storage unit stores the communication-related information corresponding to the subject information communication terminal, the reception unit receives the communication-related information corresponding to the communication partner information communication terminal when communication is established and the interval calculation unit calculates the transmission interval with which the plurality of packets are to be transmitted by the transmission unit based upon the communication-related information corresponding to the subject information communication terminal stored in the storage unit and the communication-related information corresponding to the communication partner information communication terminal received by the reception unit. Thus, the plurality of packets can be transmitted continuously with the optimal interval calculated as described above.

According to another embodiment of the present invention, there is provided an information communication terminal that engages in noncontact wireless communication by using an IC chip, comprising a transmission unit that transmits a plurality of packets continuously in a batch, a storage unit in which communication-related information corresponding to the subject information communication terminal is stored, a reception unit that receives communication-related information corresponding to another information communication terminal, i.e., a communication partner, when communication is established and an interval calculation unit that calculates a transmission interval with which the plurality of packets are to be transmitted by the transmission unit based upon the communication-related information corresponding to the subject information communication terminal stored in the storage unit and the communication-related information corresponding to the communication partner information communication terminal received by the reception unit.

At the information communication terminal adopting the structure described above, the transmission unit transmits a plurality of packets continuously in a batch, the storage unit stores the communication-related information corresponding to the subject information communication terminal, the reception unit receives the communication-related information corresponding to the communication partner information communication terminal when communication is established and the interval calculation unit calculates the transmission interval with which the plurality of packets are to be transmitted by the transmission unit based upon the communication-related information corresponding to the subject information communication terminal stored in the storage unit and the communication-related information corresponding to the communication partner information communication terminal received by the reception unit. Thus, the plurality of packets can be transmitted continuously with the optimal interval calculated as described above.

The communication-related information corresponding to the subject information communication terminal and the communication-related information corresponding to the communication partner information communication terminal may each indicate the length of processing time required in the IC chip.

The information communication terminal may be a portable telephone or it may be a reader/writer apparatus.

According to another embodiment of the present invention, there is provided a wireless communication method to be adopted in noncontact wireless communication achieved by using IC chips, comprising a storage step in which communication-related information corresponding to a subject information communication terminal is stored, a reception step in which communication-related information corresponding to a communication partner information communication terminal is received when communication is established, an interval calculation step in which a transmission interval with which a plurality of packets are to be transmitted is calculated based upon the communication-related information corresponding to the subject information communication terminal stored in the storage step and communication-related information corresponding to the communication partner information communication terminal received in the reception step and a transmission step in which the plurality of packets are transmitted continuously in a batch based upon transmission timing controlled by executing the interval calculation step.

According to another embodiment of the present invention, there is provided a computer program in conformance to which noncontact wireless communication is carried out by using IC chips, enabling a computer to execute a reception step in which communication-related information corresponding to a communication partner information communication terminal is received when communication is established, an interval calculation step in which a transmission interval with which a plurality of packets are to be transmitted is calculated based upon communication-related information corresponding to a subject information communication terminal stored in the computer and the communication-related information corresponding to the communication partner information communication terminal received in the reception step and a transmission step in which the plurality of packets are transmitted continuously in a batch based upon transmission timing controlled by executing the interval calculation step.

According to another embodiment of the present invention, there is provided a wireless communication system that includes two information communication terminals with built-in IC chips engaged in wireless communication with each other through noncontact communication. One of the information communication terminals includes a data verification unit that executes a verification as to whether or not there are any data to be transmitted to a communication partner information communication terminal, a packet generation unit that generates a packet containing data to be transmitted to the communication partner information communication terminal if results of the verification executed by the data verification unit indicate that there are data to be transmitted to the communication partner information communication terminal and generates a packet that does not contain data to be transmitted to the communication partner information communication terminal if the results of the verification indicate that there are no data to be transmitted to the communication partner information communication terminal and a transmission unit that transmits a single packet or a plurality of packets generated by the packet generation unit continuously in a batch.

At the information communication terminal adopting the structure described above, the data verification unit executes a verification as to whether or not there are any data to be transmitted to the communication partner information communication terminal, the packet generation unit generates a packet containing data to be transmitted to the communication partner information communication terminal if the results of the verification executed by the data verification unit indicates that there are data to be transmitted to the communication partner information communication terminal and generates a packet that does not contain data to be transmitted to the communication partner information communication terminal if the verification results indicate that there are no data to be transmitted to the communication partner information communication terminal and the transmission unit transmits a single packet or a plurality of packets generated by the packet generation unit continuously in a batch. In this case, if there are no data to be transmitted to the communication partner information communication terminal, a packet that does not contain data to be transmitted to the communication partner information communication terminal is transmitted, thereby allowing the partner to take a turn in communication. As a result, the data transmission order can be clarified and a collision of data transmitted from the two information communication terminals is prevented.

According to another embodiment of the present invention, there is provided an information communication terminal that engages in noncontact wireless communication by using an IC chip, comprising a data verification unit that executes a verification as to whether or not there are any data to be transmitted to a communication partner information communication terminal, a packet generation unit that generates a packet containing data to be transmitted to the communication partner information communication terminal if results of the verification executed by the data verification unit indicate that there are data to be transmitted to the communication partner information communication terminal and generates a packet that does not contain data to be transmitted to the communication partner information communication terminal if the results of the verification indicate that there are no data to be transmitted to the communication partner information communication terminal and a transmission unit that transmits a single packet or a plurality of packets generated by the packet generation unit continuously in a batch.

At the information communication terminal adopting the structure described above, the data verification unit executes a verification as to whether or not there are any data to be transmitted to the communication partner information communication terminal, the packet generation unit generates a packet containing data to be transmitted to the communication partner information communication terminal if the results of the verification executed by the data verification unit indicate that there are data to be transmitted to the communication partner information communication terminal and generates a packet that does not contain data to be transmitted to the communication partner information communication terminal if the verification results indicate that there are no data to be transmitted to the communication partner information communication terminal and the transmission unit transmits a single packet or a plurality of packets generated by the packet generation unit continuously in a batch. In this case, if there are no data to be transmitted to the communication partner information communication terminal, a packet that does not contain data to be transmitted to the communication partner information communication terminal is transmitted, thereby allowing the partner to take a turn in communication. As a result, the data transmission order can be clarified and a collision of data transmitted from the two information communication terminals is prevented.

The information communication terminal may further include a data accumulating unit that temporarily accumulates data to be transmitted to the communication partner information communication terminal and, in conjunction with the data accumulating unit, the data verification unit may execute a verification as to whether or not there are any data accumulated in the data accumulating unit.

When transmitting a packet that does not include transmission data to the communication partner information communication terminal, a longer-than-normal standby time may be allowed to elapse at the transmission unit before transmitting the packet. By lengthening the standby time, the level of power consumption at the information communication terminal can be minimized.

The information communication terminal may be a portable telephone or it may be a reader/writer apparatus.

According to another embodiment of the present invention, there is provided a communication method to be adopted in noncontact wireless communication achieved by using IC chips, comprising a data verification step in which a verification as to whether or not there are data to be transmitted to a communication partner information communication terminal is executed, a packet generation step in which a packet containing data to be transmitted to the communication partner information communication terminal is generated if the results of the verification executed in the data verification step indicate that there are data to be transmitted to the communication partner information communication terminal and a packet that does not include data to be transmitted to the communication partner information communication terminal is generated if the verification results indicate that there are no data to be transmitted to the communication partner information communication terminal and a transmission step in which a single packet or a plurality of packets generated in the packet generation step are transmitted continuously in a batch.

According to another embodiment of the present invention, there is provided a computer program in conformance to which noncontact wireless communication is carried out by using IC chips enabling a computer to execute processing that includes a data verification step in which a verification as to whether or not there are data to be transmitted to a communication partner information communication terminal is executed, a packet generation step in which a packet containing data to be transmitted to the communication partner information communication terminal is generated if the results of the verification executed in the data verification step indicate that there are data to be transmitted to the communication partner information communication terminal and a packet that does not include data to be transmitted to the communication partner information communication terminal is generated if the verification results indicate that there are no data to be transmitted to the communication partner information communication terminal and a transmission step in which a single packet or a plurality of packets generated in the packet generation step are transmitted continuously in a batch.

According to the embodiments of the present invention described above, a new and improved wireless communications system, a new and improved information communication terminal, a new and improved portable telephone, a new and improved reader/writer, a new and improved communication method and a new and improved computer program, affording an improvement in the wireless communication efficiency, are provided.

BRIEF DESCRIPTION OF THE DRAWINGS

FIG. 6A presents examples of flows of data transmitted and received at the information communication terminal with a built-in IC chip in the first embodiment of the present invention;

FIG. 6B presents examples of flows of data transmitted and received at the information communication terminal with a built-in IC chip in the first embodiment of the present invention;

FIG. 8 presents an example of a flow of data transmitted and received at the information communication terminal with a built-in IC chip in a second embodiment of the present invention.

DETAILED DESCRIPTION OF THE PREFERRED EMBODIMENTS

Figure 1:
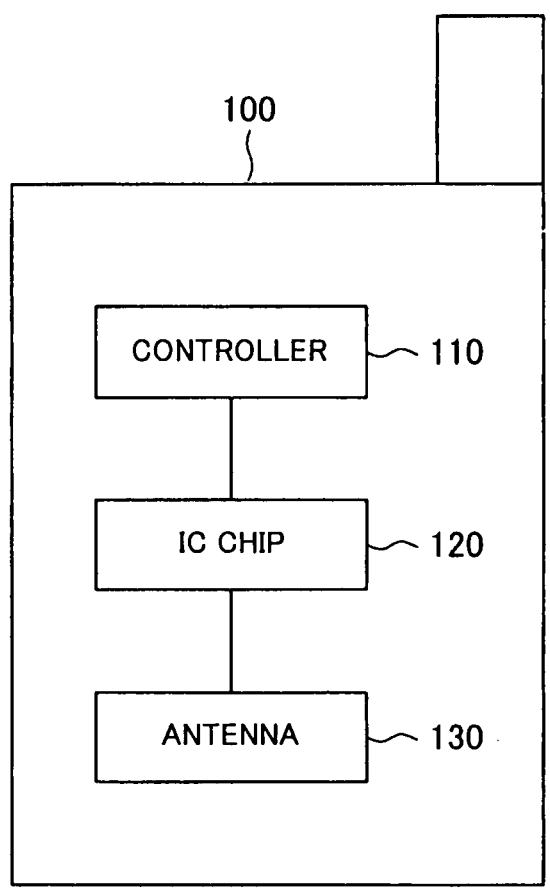
FIG. 1 illustrates the structure adopted in the information communication terminal achieved in a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

The information communication terminal and the communication method achieved in the first embodiment of the present invention are now explained.

FIG. 1 shows the structure adopted in the information communication terminal in the first embodiment of the present invention. The following is a detailed explanation of the structure of the information communication terminal achieved in the first embodiment of the present invention, given in reference to FIG. 1.

As shown in FIG. 1, an information communication terminal 100 achieved in the first embodiment of the present invention includes a controller 10, an IC chip 120 and an antenna 130.

The information communication terminal 100 engages in wireless information communication via the antenna 130 by using the air as a medium. The information communication terminal 100 may be, for instance, a compact information processing apparatus which, in turn, may be a portable telephone or a PDA.

The controller 110 controls various units constituting the IC chip and the information communication terminal 100. The individual units constituting the IC chip 120 and information communication terminal are engaged in operation in response to instructions issued by the controller 110.

The IC chip 120 is engaged in data storage, arithmetic processing and data exchange with an external apparatus achieved through noncontact communication. In addition, although not shown, the IC chip 120 may include an A/D converter that executes analog/digital information conversion to optimize data for data exchange.

The antenna 130, which represents an example of the transmission unit and the reception unit according to the present invention, releases a wireless signal originating from the IC chip 120 into the air, i.e., the transmission medium, with a specific frequency and receives a wireless signal sent from another terminal (an information communication terminal, a reader/writer apparatus or the like) with a specific frequency through the air. The signal received at the antenna through the air is then conducted to the IC chip 120. The information communication terminal 100 thus exchanges data with an external partner via wireless signals with specific frequencies transmitted/received through the antenna 120. The antenna 130 may be constituted with an antenna coil with a predetermined number of turns.

The structure adopted in the information communication terminal in the first embodiment of the present invention has been explained above in reference to FIG. 1. Now, the structure of the IC chip achieved in the first embodiment of the present invention is explained.

Figure 2:
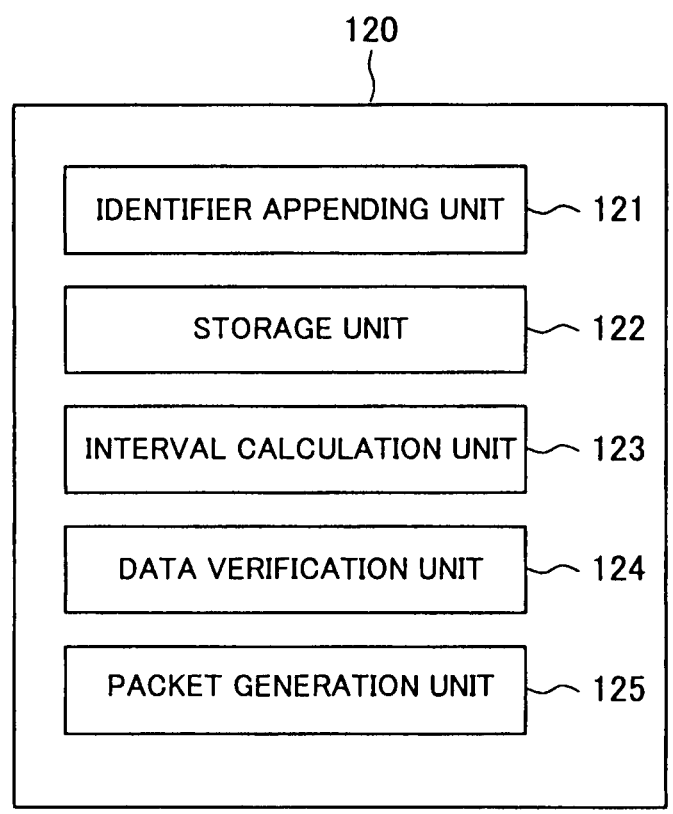
FIG. 2 illustrates the structure of the IC chip 120 used in the first embodiment of the present invention.

FIG. 2 shows the structure adopted in the IC chip 120 in the first embodiment of the present invention. The following is an explanation of the structure of the IC chip achieved in the first embodiment of the present invention, given in reference to FIG. 2.

As shown in FIG. 2, the IC chip 120 achieved in the first embodiment of the present invention includes an identifier appending unit 121, a storage unit 122, an interval calculation unit 123, a data verification unit 124 and a packet generation unit 125.

The identifier appending unit 121 appends a last packet identifier to a single packet or to a packet to be transmitted last among a plurality of packets to be transmitted continuously via the antenna 130.

In the storage unit 122, information related to the IC chip 120 is stored. The storage unit 122 may be constituted with any of various types of non-volatile memory.

The interval calculation unit 123 calculates the transmission interval with which packets are to be transmitted from the antenna 130. The calculation of the packet transmission interval is to be described in detail later.

The data verification unit 124 executes a verification as to whether or not there are any data to be transmitted to the communication partner terminal.

The packet generation unit 125 generates packets to be transmitted to the communication partner terminal. The packet generation unit 125 generates different types of packets in correspondence to the communication status. The various types of packets generated in correspondence to the communication status include, for instance, a packet used to establish communication in order to carry out wireless communication with another information communication terminal such as a reader/writer apparatus, a packet used to transmit data to the communication partner information communication terminal and a packet used to discontinue the communication.

The structure of the IC chip achieved in the first embodiment of the present invention has been explained above in reference to FIG. 2. Now, the structure adopted in a reader/writer apparatus in the first embodiment of the present invention is explained.

Figure 3:
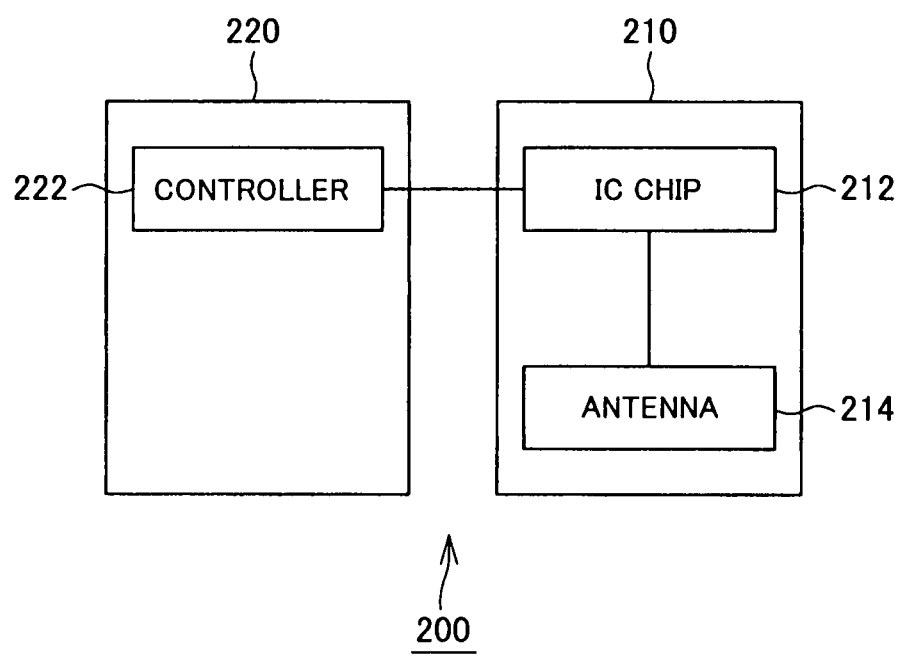
FIG. 3 shows the structure adopted in the reader/writer apparatus in the first embodiment of the present invention.

FIG. 3 shows the structure of the reader/writer apparatus achieved in the first embodiment of the present invention. The following is an explanation of the reader/writer apparatus achieved in the first embodiment of the present invention, given in reference to FIG. 3.

As shown in FIG. 3, a reader/writer apparatus 200 achieved in the first embodiment of the present invention includes a reader/writer terminal 210 and a control device 220 such as a personal computer. The reader/writer terminal 210, in turn, includes an IC chip 212 and an antenna 214, whereas the control device 220 includes a controller 222.

The reader/writer terminal 210 engages in wireless data exchange with the information communication terminal 100. As data are transmitted and received wirelessly with a specific frequency between the information communication terminal 100 and the reader/writer terminal 210, the information communication terminal 100 is able to exchange data.

The IC chip 212 is engaged in data storage, arithmetic processing and data exchange with an external apparatus achieved through noncontact communication. Since the internal structure adopted in the IC chip 212 in the embodiment is identical to that of the IC chip 120, a detailed explanation thereof is omitted. In addition, although not shown, the IC chip 212 may include an A/D converter that executes analog/digital information conversion to optimize data for data exchange via the antenna 214. The storage unit in the IC chip 212 may be any of various types of nonvolatile memory.

The antenna 214, which represents an example of the transmission unit and the reception unit according to the present invention, releases a wireless signal originating from the IC chip 212 into the air, i.e., the transmission medium, with a specific frequency and receives a wireless signal sent from another terminal, e.g., the information communication terminal 100 with the specific frequency through the air. The signal received at the antenna through the air is then conducted to the IC chip 212. The information communication terminal 100 exchanges data with the external partner via wireless signals with specific frequencies transmitted/received through the antenna 214. The antenna 214 may be constituted with an antenna coil with a predetermined number of turns.

The control device 220, connected to the reader/writer terminal 210, controls the reader/writer terminal 210. The controller 222 in the control device 220 controls the various internal units constituting the IC chip 212 and the control device 220 in the reader/writer terminal 210. The individual units in the IC chip 212 and the control device 220 are engaged in operation in response to instructions issued by the controller 222. It is to be noted that the control device 220 may be an information processing apparatus such as a personal computer.

It is to be noted that while the reader/writer terminal 210 and the control device 220 are connected through a wired connection in the reader/writer apparatus shown in FIG. 3, a wireless connection, instead of a wired connection, may be assumed in the reader/writer apparatus. In addition, while the IC chip 212 and the controller 220 are directly connected with each other in the reader/writer apparatus shown in FIG. 3, the IC chip 212 and the controller 222 may assume a different connection mode. For instance, a communication interface may be disposed between the IC chip 212 and the controller 222 so as to enable communication between the IC chip 212 and the controller 222 via the communication interface.

The structure adopted in the reader/writer apparatus in the first embodiment of the present invention has been explained above in reference to FIG. 3. Next, the wireless communication method achieved in the first embodiment of the present invention is explained by comparing it with a wireless communication method in the related art.

Figure 4A:
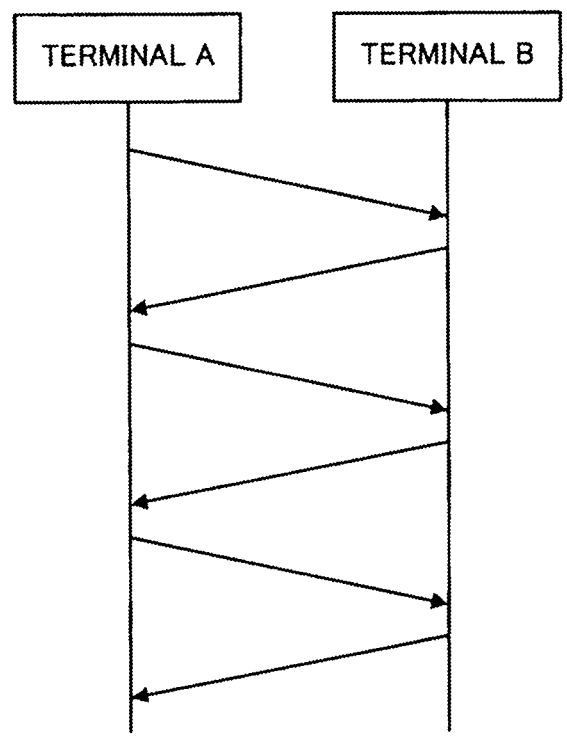
FIG. 4A illustrates the flow of data exchanged by two information communication terminals with built-in IC chips in the related art.

FIG. 4A shows the flow of data exchanged by two information communication terminals with built-in IC chips in the related art. The two information communication terminals with the built-in IC chips are referred to as "terminal A" and "terminal B". Terminal A may be a reader/writer terminal with a built-in IC chip, whereas terminal B may be a portable telephone or a card with a built-in IC chip.

Data exchanged between terminal A and terminal B flow as described below in the related art. First, terminal A and terminal B are connected through a handshake protocol. Prior to data exchange, the information communication terminals must establish handshake communication. The handshake may be established as the information communication terminal with a built-in IC chip accesses the reader/writer terminal with the built-in IC chip transmitting, for instance, a polling signal.

With the handshake established, terminal A, which is a data sender terminal in this example, transmits data to terminal B. Upon receiving the data originating from terminal A, terminal B processes the data from terminal A and transmits appropriate response data to terminal A. Upon receiving the response data from terminal B, terminal A processes the response data and if more data need to be transmitted from terminal A to terminal B, the data are transmitted from terminal A to terminal B.

As described above, data are alternately transmitted/received by the two terminals in the related art. However, only a single packet can be transmitted through a given transmission in the related art. In other words, once a packet is transmitted, another packet cannot be transmitted until the response from the partner is received or a timeout occurs. In addition, there is a limit to the volume of data that can be transmitted in a single packet through each transmission. This gives rise to a concern that as long as data are transmitted upon receiving the response from the partner, the communication efficiency cannot be improved, resulting in a significant length of time required to completely transmit all the data that need to be transmitted.

Accordingly, in the communication method achieved in the first embodiment of the present invention, packets are transmitted in a batch if a specific condition is satisfied so as to improve the communication efficiency and reduce the length of time required for data transmission, unlike in the related art in which only a single packet can be transmitted at a time.

In order to enable continuous batch transmission of a plurality of packets, the following protocol must be in place.

Firstly, each IC chip is allowed to assume a new state in which no response is received after transmitting data. In the related art, after data are transmitted from an IC chip, the IC chip cannot execute subsequent data transmission until a response to the data having been transmitted is received. By effectively addressing this issue, a new state, in which the IC chip is enabled to transmit next data even when there is no response to the data already transmitted from the IC chip, is created, so as to allow a plurality of packets to be transmitted at once.

Secondly, a last packet identifier is appended to a packet to be transmitted last among packets to be transmitted continuously in a batch from the IC chip. If a plurality of packets are transmitted without appending an identifier, the recipient information communication terminal having received the packets is not able to ascertain the correct timing with which it should send a response to the data sender. Accordingly, a plurality of packets are transmitted continuously in a batch by appending an identifier to the last packet in the batch so as to enable the recipient terminal having received the packet to send a response to the sender terminal with the correct timing.

By putting in place a protocol with regard to data exchange between information processing terminals with built-in IC chips as described above, a plurality of packets can be transmitted/received continuously in a batch by the information processing terminals with the built-in IC chips.

Figure 4B:
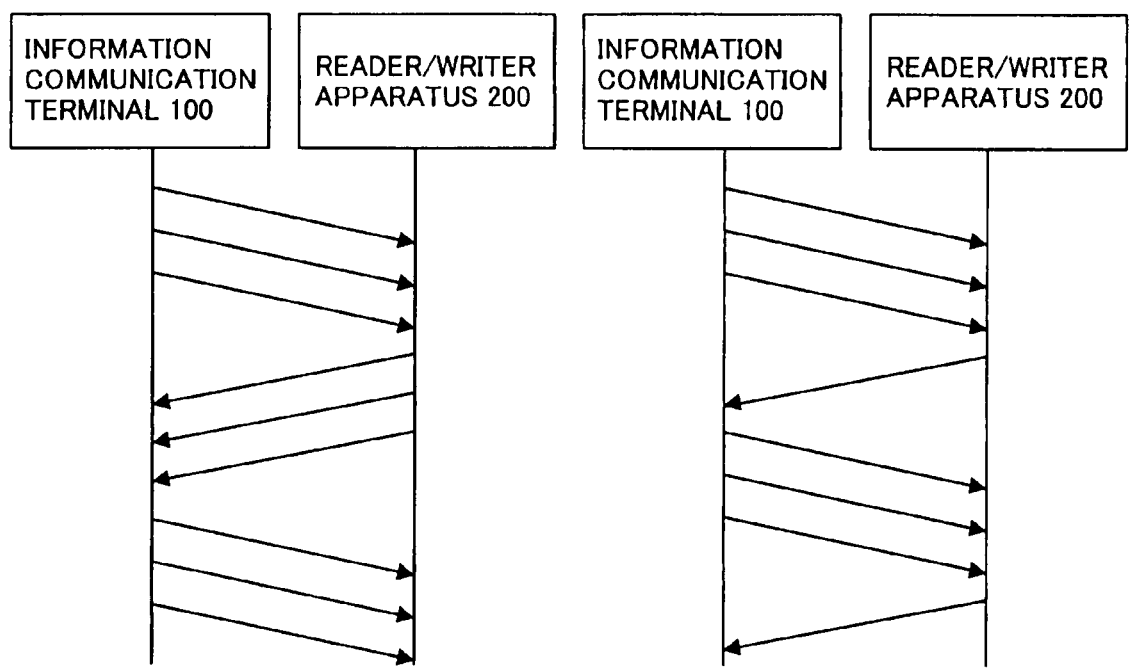
FIG. 4B illustrates the flows of data exchanged by two information communication terminals in the first embodiment of the present invention.

FIG. 4B shows how data exchanged by the two information communication terminals may flow in the first embodiment of the present invention. The following is an explanation of the communication method achieved in the first embodiment of the present invention, given in reference to FIG. 4B.

The left side of FIG. 4B presents an example of a flow of data exchanged between the information communication terminals with the built-in IC chips in the embodiment of the present invention. Data exchange between the information communication terminal 100 and the reader/writer apparatus 100 is explained in reference to the left side of FIG. 4B. As shown in the left side of FIG. 4B, the information communication terminal 100 and the reader/writer apparatus 200 with the built-in IC chips each transmit a plurality of packets continuously in a batch in the flow of the data exchanged between the information communication terminal 100 and the reader/writer apparatus 200 in the embodiment of the present invention.

First, in order to establish communication between the information communication terminal 100 and the reader/writer apparatus 200, they need to achieve a handshake connection by exchanging handshake packets with each other. The handshake packets each contain information needed when carrying out communication between the information communication terminal 100 and the reader/writer apparatus 200. The information needed for communication may indicate the number of packets that the subject terminal/apparatus is capable of receiving continuously, the total volume of data that the subject terminal/apparatus is capable of receiving in a batch, the length of time required by the subject terminal/apparatus to execute data processing or the like.

In this embodiment, at the time of establishing the handshake, the information communication terminal 100 and the reader/writer apparatus 200 each transmit information to the partner in the handshake packet indicating that three packets can be received continuously.

In the example presented in the left side of FIG. 4B, three packets are transmitted continuously in a batch to the reader/writer apparatus 200 from the IC chip 120 at the information communication terminal 100 via the antenna 130. An identifier is appended by the identifier appending unit 121 in the IC chip 120 to the third packet transmitted from the information communication terminal 100 so as to indicate that the data contained in the third packet transmitted from the information communication terminal 100 are the last data in the transmission from the communication terminal 100.

Upon receiving the third packet from the information communication terminal 100 via the antenna 214, the reader/writer apparatus 200 judges that the third packet signals the timing with which a response should be sent to the information communication terminal 100. Then, the reader/writer apparatus 200 transmits data to the information communication terminal 100 from the IC chip 212 via the antenna 214. As is the information communication terminal 100, the reader/writer apparatus 200, too, is able to transmit data in a plurality of packets continuously in a batch. In addition, the identifier appending unit in the IC chip 212 appends an identifier to the last packet to be transmitted from the reader/writer apparatus 200. The information communication terminal 100 receiving the packet appended with the last packet identifier among the packets transmitted from the reader/writer apparatus 200 in a batch is able to recognize the timing with which response should be sent to the reader/writer apparatus 200.

Packets are repeatedly exchanged as described above until all the data have been transmitted/received.

As described above, the communication method achieved in the embodiment of the present invention allows a plurality of packets to be transmitted continuously in a batch. As a result, the length of time required for data exchange is reduced and the data communication efficiency is improved over the method through which the communication partners take turns to transmit a single packet.

While an explanation is given above in reference to The left side of FIG. 4B on an example in which the communication partners each transmit a plurality of packets continuously, the present invention is not limited to this example and it may be adopted in a data flow whereby one partner transmits a plurality of packets continuously and the other partner transmits only one packet at a time. The right side of FIG. 4B presents another example of a flow of data exchanged by the information communication terminal and the reader/writer apparatus with the built-in IC chips in the first embodiment of the present invention.

In the example presented in the right side of FIG. 4B, three packets are transmitted at once from the information communication terminal 100, whereas a single packet is transmitted from the reader/writer apparatus 200. In this example, too, the identifier appending unit appends a last packet identifier to the packet to be transmitted last in a batch transmission from the corresponding terminal so as to allow the recipient terminal to ascertain the correct response timing by recognizing the identifier at the recipient terminal. Even though the reader/writer apparatus 200 transmits one packet at a time, the information communication terminal 100 still needs to be able to determine if the packet transmitted from the reader/writer apparatus 200 is to be followed by another packet or if it is the last packet so as to ascertain the correct response timing with which it should respond to the reader/writer apparatus 200. The identifier appending unit in the IC chip 212 at the reader/writer apparatus 200 appends an identifier to the packet so as to enable the information communication terminal 100 to recognize the correct response timing with which the information communication terminal 100 is to respond to the reader/writer apparatus 200.

Even when the number of packets that can be transmitted and received continuously by the terminals engaged in wireless communication do not match, as in this case, the length of time required for the data exchange can be reduced and the data communication efficiency can be improved by adopting the communication method described above.

It is to be noted that while a plurality of packets are transmitted continuously in the examples described above, it is not strictly necessary to transmit a plurality of packets at once. For instance, while a terminal may be capable of transmitting three packets in a batch, it may transmit a single packet or it may transmit two packets in a batch if the volume of data to be transmitted is small enough to be contained in one or two packets.

The flows of data exchanged through the wireless communication method achieved in the first embodiment of the present invention have been explained in reference to FIG. 4B. Next, the wireless communication method achieved in the first embodiment of the present invention is described in further detail.

Figure 5:
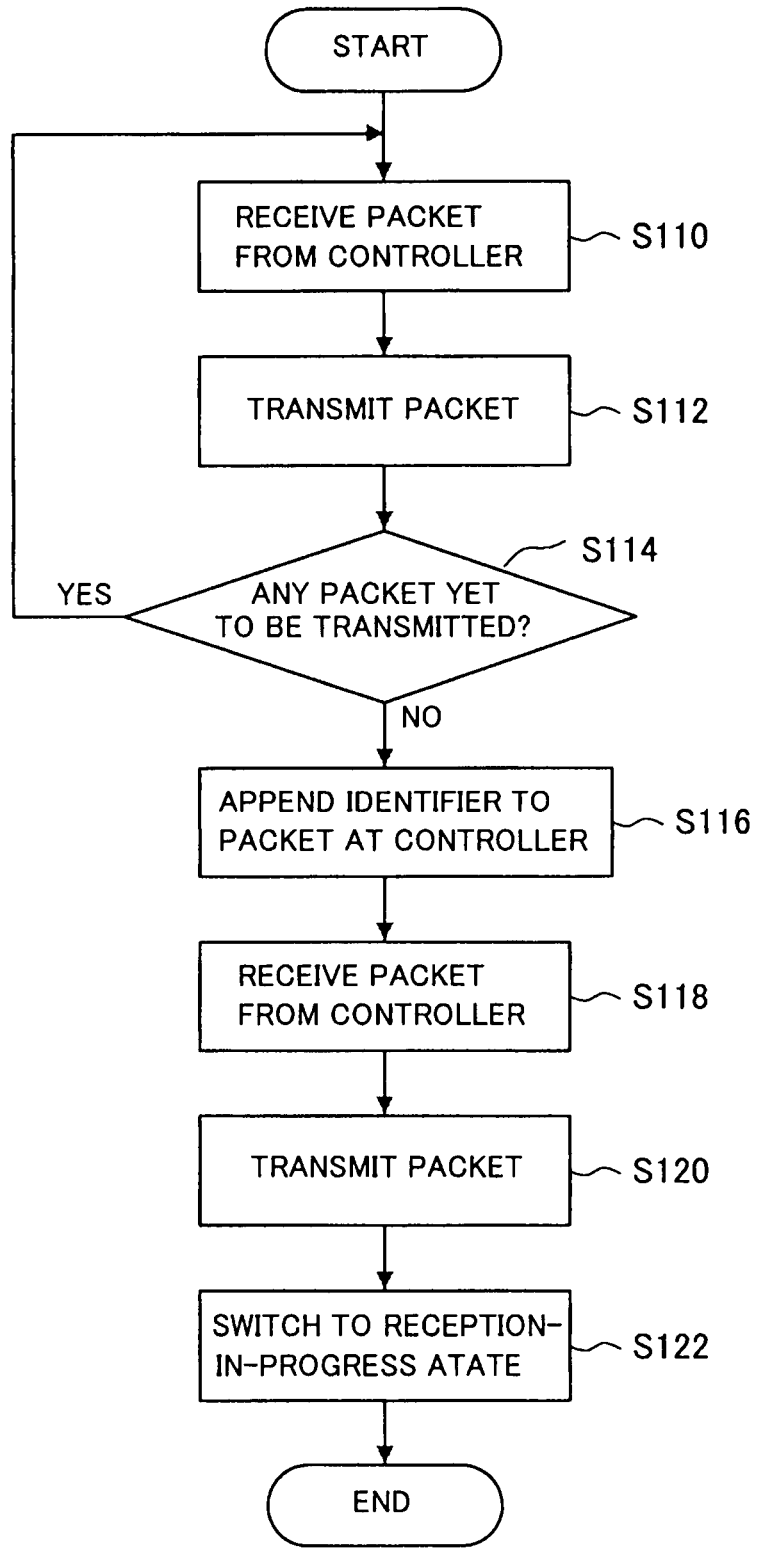
FIG. 5 presents a flowchart of wireless communication executed in conjunction with IC chips by adopting the wireless communication method achieved in the first embodiment of the present invention.

FIG. 5 presents a flowchart of the wireless communication processing executed by adopting the wireless communication method achieved by using IC chips in the first embodiment of the present invention. The wireless communication method achieved by using IC chips in the first embodiment of the present invention is now explained in reference to FIG. 5. It is assumed that prior to the start of the processing shown in FIG. 5, the terminals to be engaged in wireless communication have established handshake communication and have exchanged the specific information.

In the wireless communication method achieved by using IC chips in the first embodiment of the present invention, the IC chip 120 first receives from the controller 110 a packet to be transmitted to the communication partner terminal (step S10). Upon receiving the packet, the IC chip 120 transmits the packet via the antenna 130 to the packet recipient reader/writer apparatus 200 (step S112).

Next, a decision is made in the IC chip 120 as to whether or not there is a packet yet to be transmitted (step S114). If the results of the decision indicate that there is an untransmitted packet, the operation returns to step S110 and the IC chip 120 receives the packet from the controller 110. If, on the other hand, it is decided that there is no untransmitted packet, the controller 110 appends an identifier to the last packet to be transmitted (step S116).

The IC chip 120 receives the packet appended with the identifier from the controller 110 (step S118) and transmits the packet via the antenna 130 to the packet recipient reader/writer apparatus 200 (step S120). Then, since the entire packet transmission has been completed, it switches the internal state at the information communication terminal 100 to a reception-in-progress state in which it receives packets from the reader/writer apparatus 200 (step S122).

Based upon the identifier appended to the last packet, as described above, the terminal having transmitted the packet appended with the identifier is able to switch to the reception-in-progress state for data reception and the recipient terminal having received the packet appended with the identifier is able to switch to the transmission-in-progress state for data transmission.

The wireless communication method achieved in the first embodiment of the present invention has been explained above in reference to FIG. 5.

In the first embodiment of the present invention described above, a plurality of packets can be continuously transmitted/received at information communication terminals with built-in IC chips. In other words, data can be continuously transmitted from a given terminal. However, there are situations in which the communication efficiency is compromised if data are continuously transmitted from a single terminal. For instance, the communication efficiency may be compromised if the timing with which the IC chip receives data from a host controller or the like and the timing with which the IC chip starts the wireless transmission of the data are out of sync, manifested as a long interval between the time point at which the data are received and the time point at which the data are transmitted, i.e., a protracted data transmission standby state. If, on the other hand, the data can be transmitted immediately after they are transferred from the host, the data transmission standby state does not last long and the communication efficiency is improved.

Accordingly, when starting communication between the information communication terminals, i.e., at the time of the handshake between the information communication terminals, the communication partners exchange parameters related to the communication so as to improve the communication efficiency. For instance, information communication terminals may exchange communication-related parameters each indicating the number of packets that can be continuously received at the time of the handshake. As each information communication terminal obtains the information indicating the number of packets that can be received continuously by the partner at the time of the handshake, the communication efficiency is improved.

FIGS. 6A and 6B present examples of flows of data exchanged between the information communication terminals with the built-in IC chips in the first embodiment of the present invention. FIG. 6A presents an example in which packets are exchanged one at a time between the information communication terminal 100 and the reader/writer apparatus 200, whereas FIG. 6B presents an example in which packets are exchanged three at a time between the information communication terminal 100 and the reader/writer apparatus 200.

In the examples presented in FIGS. 6A and 6B, data are received from the host controller or the like at the information communication terminal 100 with identical timing. Under these circumstances, data communication is executed at a higher rate in the example presented in FIG. 6B, in which packets are exchanged three at a time, than in the example presented in FIG. 6A. At the same time, a greater time interval elapses between the time point at which the IC chip receives the data from the host controller or the like and the time point at which the IC chip starts wireless transmission of the data in the example presented in FIG. 6B than in the example presented in FIG. 6A. In other words, better data communication efficiency is achieved in the example presented in FIG. 6A, since the IC chip is able to transmit the data to the partner reader/writer apparatus 200 as soon as it receives the data.

Accordingly, the packets exchanged by the information communication terminal and the reader/writer apparatus at the time of handshake each contain information indicating the number of packets to be transmitted/received at a time so as to best improve the communication efficiency in a given communication environment including factors such as the controller performance and the surrounding conditions.

It is to be noted that while the information communication terminals exchange at the time of the handshake packets each containing information indicating the number of packets that the subject information communication terminal can receive continuously from the partner information communication terminal in the embodiment, the present invention is not limited to this example and the information communication terminals may exchange at the time of handshake packets each containing information indicating the value of data that the subject information communication terminal can receive in packets at a time from the partner information communication terminal. As the volume of data that can be received in a packet at once by each information communication terminal is indicated to the communication partner at the time of the handshake, the information communication terminals are able to carry out wireless communication with communication characteristics matching the communication contents.

Figure 7A:
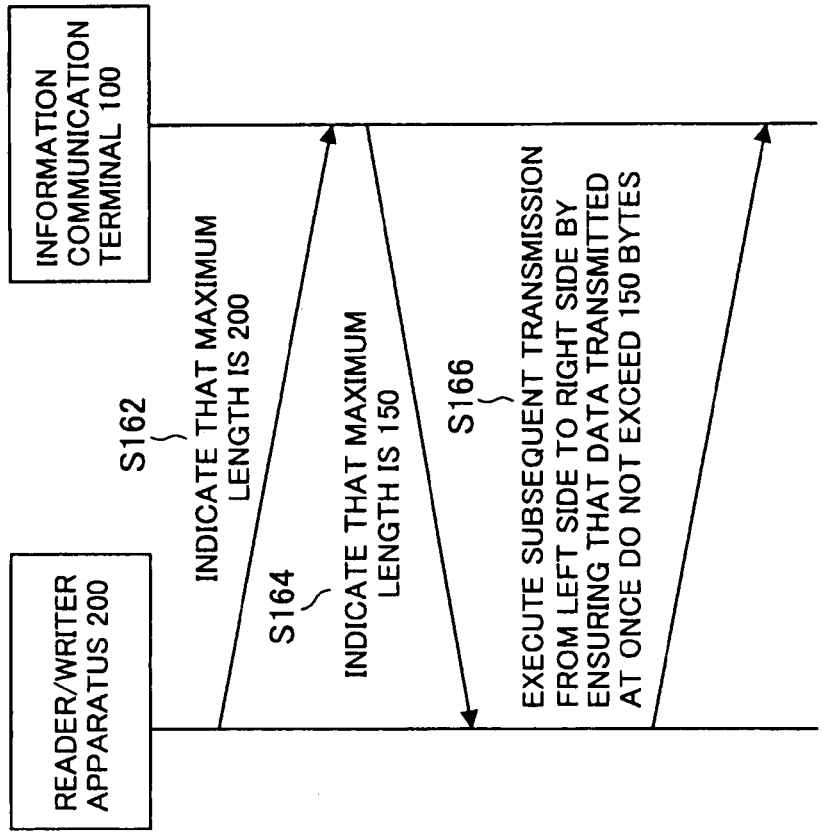
FIG. 7A presents other examples of flows of data exchanged by the reader/writer apparatus and the information communication terminal with built-in IC chips in the first embodiment of the present invention.
Figure 7B:
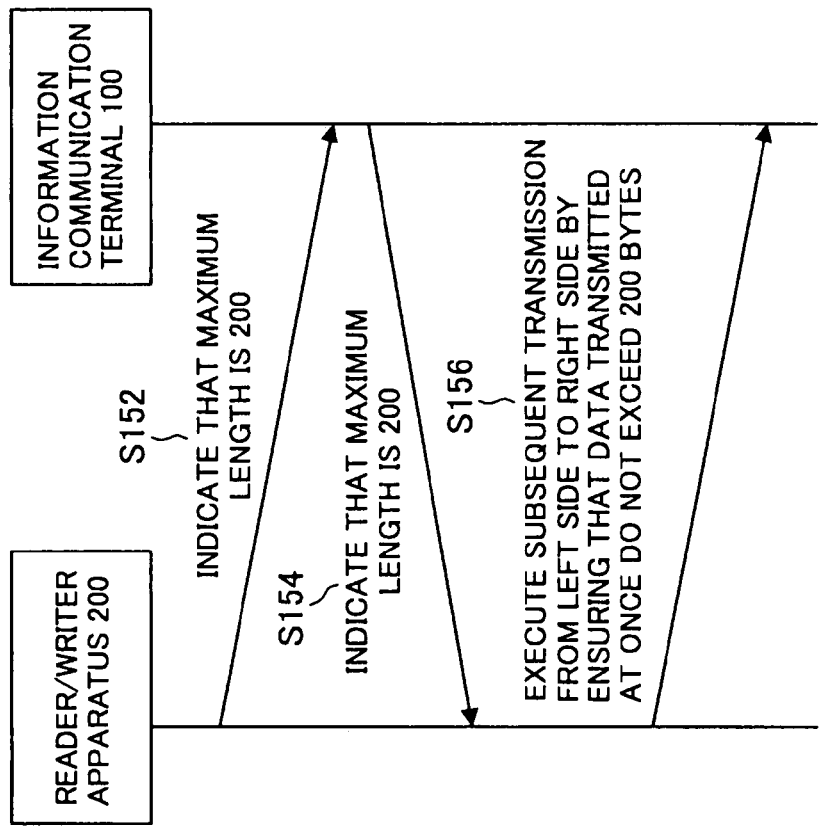
FIG. 7B presents other examples of flows of data exchanged by the reader/writer apparatus and the information communication terminal with built-in IC chips in the first embodiment of the present invention.

FIGS. 7A and 7B present other examples of flows of data exchanged by the reader/writer apparatus and the information communication terminal with the built-in IC chips in the first embodiment of the present invention. In reference to FIGS. 7A and 7B, the other examples of flows of data exchanged by the reader/writer apparatus and the information communication terminal with the built-in IC chip are explained below.

FIG. 7A presents another example of a flow of data exchanged by the reader/writer apparatus and the information communication terminal with the built-in IC chips in the first embodiment of the present invention. In the example of data exchange shown in FIG. 7A, the IC chip 212 in the reader/writer apparatus 200 transmits via the antenna 214 a packet to be used for purposes of establishing the handshake (hereafter may be also referred to as a "handshake packet") to the information communication terminal 100 when the reader/writer apparatus 200 and the information communication terminal 100 are to establish handshake to start communication. The handshake packet transmitted to the information communication terminal 100 contains information indicating the maximum packet length of packets to be received at the reader/writer apparatus 200. In the embodiment, the handshake packet contains information indicating that the reader/writer apparatus is capable of receiving a packet assuming a length of up to 200 bytes (step S152). It is obvious, however, that the maximum packet length in the present invention is not limited to this example.

Upon receiving the handshake packet from the reader/writer apparatus 200, the IC chip 120 in the information communication terminal 100 transmits via the antenna 130 a response packet (hereafter may also be referred to as a "handshake response packet") to the reader/writer apparatus 200. The handshake response packet transmitted to the reader/writer apparatus 200 contains information indicating the maximum packet length of packets received at the information communication terminal 100. In the embodiment, the handshake response packet contains information indicating that the information communication terminal is capable of receiving a packet assuming a length of up to 200 bytes (step S154). It is obvious, however, that the maximum packet length in the present invention is not limited to this example.

Once the information communication terminals exchange information with each other as described above at the initial stage of wireless communication enabled by using IC chips, they are able to carry out wireless communication with communication characteristics matching the communication contents.

In the example presented in FIG. 7A, the controller 222 adjusts the packet size so as to ensure that data transmitted from the reader/writer apparatus 200 to the information communication terminal 100 at a time do not exceed 200 bytes (step S156).

In the example presented in FIG. 7A, the two communication partners allow packets that they receive through a single communication operation to assume maximum lengths equal to each other, i.e., the two information communication terminals have installed therein the same type of IC chips. As described above, they exchange parameters at the time of the handshake at the start of communication, and thus, even if different types of IC chips are installed at the two communication partners, e.g., even if the IC chips at the communication partners allow packets to assume different maximum lengths for a single reception transaction, the information communication terminals are able to carry out communication with no problem.

FIG. 7B presents yet another example of a flow of data exchanged by the two information communication terminals with the built-in IC chips in the first embodiment of the present invention. In the example of data exchange shown in FIG. 7B, the IC chip 212 in the reader/writer apparatus 200 transmits via the antenna 214 a handshake packet to the information communication terminal 100 when the reader/writer apparatus 200 and the information communication terminal 100 are to establish handshake to start communication. The handshake packet transmitted to the information communication terminal 100 contains information indicating the maximum allowable length of that packet received at the reader/writer apparatus 200. In the embodiment, the handshake packet contains information indicating that the reader/writer apparatus is capable of receiving a packet assuming a length of up to 200 bytes (step S162). It is obvious, however, that the maximum packet length in the present invention is not limited to this example.

Upon receiving the handshake packet from the reader/writer apparatus 200, the IC chip 120 in the information communication terminal 100 transmits via the antenna 130 a handshake response packet to the reader/writer apparatus 200. The handshake response packet transmitted to the reader/writer apparatus 200 contains information indicating the maximum allowable length of that packet received at the information communication terminal 100. In the embodiment, the handshake response packet contains information indicating that the information communication terminal is capable of receiving a packet assuming a length of up to 150 bytes (step S164). It is obvious, however, that the maximum packet length in the present invention is not limited to this example.

Since the reader/writer 200 receives the information in the handshake response packet indicating that the information communication terminal 100 allows a packet length of up to 150 bytes, the IC chip 212 adjusts the packet size so as to ensure that data transmitted from the reader/writer apparatus 200 to the information communication terminal 100 through a single communication transaction do not exceed 150 bytes in the example presented in FIG. 7B (step S166).

As described above, the information indicating the volumes of data the information communication terminals are able to receive continuously is exchanged at the time of the handshake. As a result, even when a different type of IC chip, capable of receiving a packet with a different maximum packet length or the like is utilized at the communication partner, as well as when the communication partner uses the same type of IC chip, the information communication terminals are able to carry out wireless communication with the communication characteristics matching the communication contents.

It is to be noted that the wireless communication method described above may be implemented in conformance to a computer program stored in the information communication terminal 100 or the reader/writer apparatus 200.

The information communication terminal and the wireless communication method achieved in the first embodiment has been described so far.

As explained above, in the first embodiment of the present invention, the communication rate and the communication efficiency can both be improved by continuously transmitting/receiving a single packet or a plurality of packets in the communication carried out by information communication terminals with built-in IC chips instead of taking turns to transmit/receive one packet at a time. In addition, the communication efficiency is further improved by exchanging communication-related parameters such as the number of packets that can be received continuously, the maximum volume of data that can be received in a packet or the like when the information communication terminals establish handshake at communication start.

Second Embodiment

An information communication terminal and a wireless communication method with which the communication rate and the communication efficiency can be improved by transmitting/receiving a single packet or a plurality of packets continuously have been explained in reference to the first embodiment of the present invention. In reference to the second embodiment of the present invention, an information communication terminal and a wireless communication method which ensure that the packet recipient is able to receive packets successfully by controlling the packet transmission interval with which packets are transmitted continuously are explained.

An IC chip needs to complete processing on the current set of data before it can process the next set of data. For this reason, the data transmission interval must be controlled during data transmission at an information communication terminal with a built-in IC chip capable of transmitting data continuously. The following is an explanation of a method that may be adopted at the information communication terminal with the built-in IC chip to control the data transmission interval when transmitting data.

Since the internal structures adopted in the information communication terminal and the reader/writer apparatus in the second embodiment of the present invention are identical to the internal structures of the information communication terminal and the reader/writer apparatus shown in FIGS. 1 and 3, their detailed explanation is omitted.

FIG. 8 shows how data transmitted from/received at the information communication terminal with the built-in IC chip may flow in the second embodiment of the present invention. FIG. 8 shows part of the flow of the data transmitted from/received at the information communication terminal with the built-in IC chip. In reference to FIG. 8, the wireless communication method achieved in the second embodiment of the present invention is explained.

When a packet is transmitted from the information communication terminal 100 to the reader/writer apparatus 200, the controller 110 first transmits the packet to the IC chip 120. TDa represents the length of time required for the packet transmission.

Upon receiving the data from the controller 110, the IC chip 120 processes the received packet. The packet processing executed at this time may be, for instance, A/D conversion processing on the data. TDb represents the length of time required for the packet processing executed in the IC chip 120.

Once the packet processing in the IC chip 120 is completed, the packet is wirelessly transmitted to the reader/writer apparatus 200 via the antenna 130. TDc represents the length of time required for the wireless packet transmission.

The reader/writer apparatus 200 having wirelessly received the packet from the information communication terminal 100 via the antenna 214 then processes the received packet in the IC chip 212. The packet processing executed at this time may be, for instance, A/D conversion processing on the data. TDb' represents the length of time required for the packet processing executed in the IC chip 212.

Once the packet processing executed in the IC chip 212 is completed, the IC chip 212 transmits the packet to the controller 222. TDd' represents the length of time required for the packet transmission from the IC chip 212 to the controller 222.

Upon receiving the packet, the controller 222 processes the received packet. The packet processing executed at this time may be, for instance, analysis processing on the received packet. While the IC chip 212 is unable to receive another set of data immediately after transmitting the received packet to the controller 222, the IC chip 212 reenters a packet reception-ready state after a specific length of time elapses. TDe' represents the specific length of time.

As described above, after the controller 222 at the reader/writer apparatus 200 receives a packet from the IC chip 212, the reader/writer apparatus needs to allow a specific interval to elapse before it becomes ready to receive the next packet. For this reason, the information communication terminal 100 needs to control the length of standby time to elapse before the information communication terminal, having transmitted a given packet, transmits the next packet, i.e., the length of standby time IVa to elapse after the controller 110 transmits a packet to the IC chip 120 and receives an Ack (acknowledgment) from the IC chip 120 until it transmits the next packet.

As the controller 110 transmits the next packet to the IC chip 120 following the standby time IVa, it is ensured that the IC chip 212 is able to receive the data successfully.

The standby time IVa to elapse at the information communication terminal 100 cannot be calculated based upon the parameters corresponding to the information communication terminal 100 alone, since it need to be calculated by factoring in the information corresponding to the reader/writer apparatus 200, as well. More specifically, the standby time IVa must be calculated based upon information indicating the length of time required for the processing executed in the IC chip 212, the length of time required for the packet transmission from the IC chip 212 to the controller 222 and the specific length of time to elapse before the IC chip 212 enters the packet reception-ready state as well.

Accordingly, when the information communication terminal 100 and the reader/writer apparatus 200 establish handshake at the communication start, they exchange the parameters corresponding to the information communication terminal 100 and the parameters corresponding to the reader/writer apparatus 200. The handshake between the information communication terminal 100 and the reader/writer apparatus 200 is achieved as one of the communication partners transmits the handshake packet and the other partner having received the handshake packet transmits the handshake response packet. The handshake packet and the handshake response packet contain these parameters so as to exchange the parameter information through the handshake.

In more specific terms, information indicating the length of time TDa required for the packet transmission from the controller 110 to the IC chip 120, the length of time TDb required for the packet processing in the IC chip 120 and the length of time TDc required for the wireless packet transmission, is transmitted from the information communication terminal 100, whereas information indicating the length of time TDb' required for the packet processing in the IC chip 212, the length of time TDd' required for the packet transmission from the IC chip 212 to the controller 222 and the specific length of time TDe' to elapse after the IC chip 212 transmits the packet to the controller 222 until the IC chip 212 reenters the packet reception-ready state is transmitted from the reader/writer apparatus 200.

Based upon the information exchanged at the time of the handshake, the interval calculation unit 123 is able to calculate the length of standby time IVa. Assuming the value of 0 for both the transmission time over which the Ack is transmitted from the IC chip 120 to the controller 110 and the length of time S required for the first bit to reach the IC chip 212 following the wireless communication start at the IC chip 120, which are extremely small, the standby time IVa may be calculated as expression 1 below.

$$IVa = TDb + TDc + TDb' + TDd' + TDe' - (TDa + TDb) = TDc + TDb' + TDd' + TDe' - TDa \quad \text{(expression 1)}$$

As the standby time IVa is calculated as expression 1, the packet transmission interval to be allowed at the controller 110 is determined.

When transmitting packets continuously from the information communication terminal 100, the controller 110, having transmitted a packet to the IC chip 120, stays in a standby state over the standby time IVa after receiving the Ack from the IC chip 120. Then, the controller 110 transmits the next packet to the IC chip 120 so as to ensure that the data are received successfully at the IC chip 212 in the packet recipient reader/writer apparatus 200.

The wireless communication method achieved in the second embodiment of the present invention has been explained above.

It is to be noted that if the standby time IVa calculated by the interval calculation unit 123 assumes a negative value, IVa may be set to 0 so that the controller 110 having received the Ack from the IC chip 120 immediately transmits the next packet.

In addition, a lower limit value may be set for the standby time IVa. When the calculated standby time IVa assumes a certain value or another parameter assumes a certain value, the IC chip 120 currently transmitting a packet to the antenna 130 may receive the next packet from the controller 110. Under such circumstances, depending upon the type of IC chip 120, the IC chip may not be able to accept the packet from the controller 110, the packet transmission to the antenna 130 may be interrupted or the data may be destroyed which may be followed by disabled ad hoc communication. These undesirable results can be avoided by setting a lower limit value to the standby time IVa.

It is to be noted that the wireless communication method described above may be implemented in conformance to a computer program stored in the information communication terminal 100 or the reader/writer apparatus 200.

The information communication terminal and the wireless communication method achieved in the second embodiment has been described so far.

As described above, in the second embodiment of the present invention, the information processing terminal with the built-in IC chip calculates the optimal transmission interval to be set when transmitting packets continuously and transmits packets with the optimal interval thus calculated so as to ensure that the packets are received successfully at the packet recipient.

Third Embodiment

In reference to the second embodiment of the present invention, an information communication terminal with a built-in IC chip and a wireless communication method which ensure that packets transmitted continuously are received successfully at the packet recipient by controlling the packet transmission interval based upon the optimal transmission interval having been calculated for continuous packet transmission, have been explained. Now, in reference to the third embodiment of the present invention, an information communication terminal equipped with a built-in IC chip and a wireless communication method which ensure that during data communication between the information communication terminals with built-in IC chips, the communication interval is increased if there are no data to be transmitted are explained.

An information communication terminal with a built-in IC chip may include a buffer where data to be transmitted to the communication partner are temporarily saved. Such an information communication terminal transmits data to the communication partner by obtaining the data from the buffer, generating a packet of a specific size and transmitting the packet from the IC chip to the communication partner via the antenna.

When such information communication terminals with built-in IC chips exchange data, either of them may temporarily run out of data to be transmitted while the communication is in progress, e.g., the buffer may temporarily run out of data. Under such circumstances, it may become unclear as to which party should start the next transmission.

Accordingly, in reference to the third embodiment of the present invention, information communication terminals with built-in IC chips and a wireless communication method which ensure that if the information communication terminals with the built-in IC chips engaged in data exchange run out of data to transmit to the other terminals, they exchange blank data so as to verify the transmission order with each other, with the transmission interval increased for the blank data transmission, are explained.

Since the internal structures adopted in the information communication terminal and the reader/writer apparatus in the third embodiment of the present invention are identical to the internal structures of the information communication terminal 100 and the reader/writer apparatus 200 shown in FIGS. 1 and 3, their detailed explanation is omitted.

Figure 9:
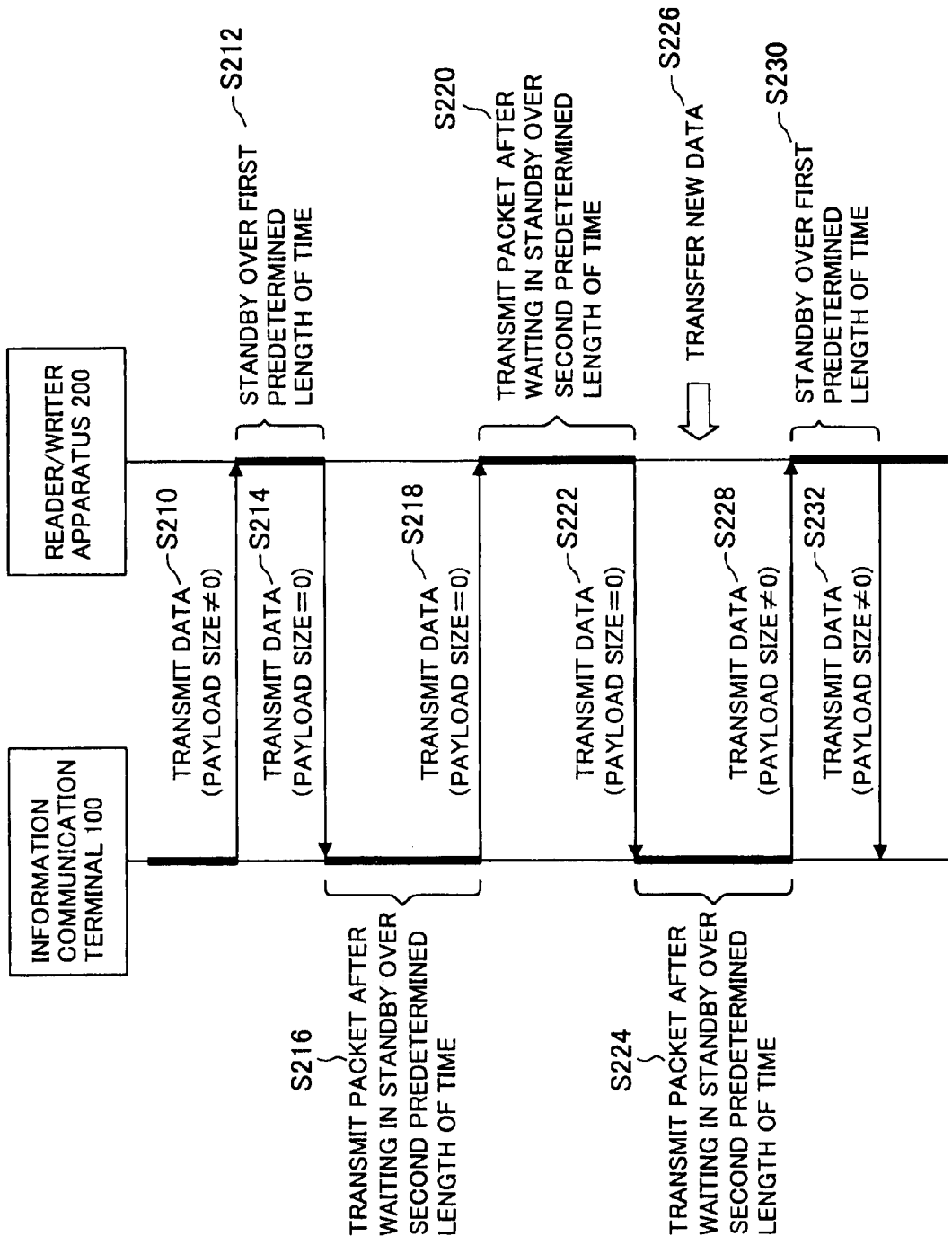
FIG. 9 presents another example of a flow of data exchanged by the information communication terminal and the reader/writer apparatus with built-in IC chips in a third embodiment of the present invention.

FIG. 9 presents an example of a flow of data exchanged by the information communication terminal and the reader/writer apparatus each equipped with a built-in IC chip in the third embodiment of the present invention. The data flow shown in FIG. 9 is part of the flow of data exchanged between the information communication terminal and the reader/writer apparatus with the built-in IC chips. While the information communication terminal and the reader/writer apparatus will have established handshake communication and specific processing will have been executed before the state shown in FIG. 9 is achieved, an explanation of the detailed processing flow of these operations is omitted.

Data are wirelessly transmitted from the IC chip 120 at the information communication terminal 100 to the reader/writer apparatus 200 via the antenna 130 (step S210). The payload size of the packet transmitted at this time is other than zero. In other words, the packet transmitted in this step contains data. The following explanation is given on the assumption that the information communication terminal 100 has run out of data to be transmitted with this timing.

The reader/writer apparatus 200 having received the data from the information communication terminal 100 stays in standby over a first specific length of time before it transmits a response (step S212). At this time, the data verification unit in the IC chip 212 makes a decision as to whether or not there are any data to be transmitted to the information communication terminal 100 and if it is decided that there are no data to be transmitted to the information communication terminal 100, the packet generation unit in the IC chip 212 generates a packet with its payload size assuming the value of 0 after staying in standby over the first specific length of time. Then, the reader/writer apparatus 200 transmits the packet having been generated from the IC chip 212 to the information communication terminal 100 via the antenna 214 (step S214), so as to switch the data transmission order by giving the next transmission turn to the information communication terminal 100. The first specific length of time represents the length of time to elapse before the response is transmitted following the data reception at the IC chip.

The information communication terminal 100 having received the data with the payload size at 0 from the reader/writer apparatus 200 stays in standby over a second specific length of time until it transmits a response (step S216). At this time, the data verification unit 124 makes a decision as to whether or not there are any data to be transmitted to the reader/writer apparatus 200 and if it is decided that there are no data to be transmitted to the reader/writer apparatus 200, the packet generation unit 125 generates a packet with its payload size assuming the value of 0 after staying in standby over the second specific length of time. Then, the information communication terminal 100 transmits the packet having been generated to the reader/writer apparatus 200 (step S218), so as to switch the data transmission order by giving the next transmission turn to the reader/writer apparatus 200. The second specific length of time represents the length of time to elapse before the response is transmitted following the data reception, set to a greater value than the first specific length of time set so as to assure effective terminal utilization when the communication partners are temporarily out of transmission data.

The reader/writer apparatus 200 having received the data with a payload size of 0 from the information communication terminal 100 stays in standby over the second specific length of time until it transmits a response (step S220). At this time, the data verification unit in the IC chip 212 makes a decision as to whether or not there are any data to be transmitted to the information communication terminal 100 and if it is decided that there are no data to be transmitted to the information communication terminal 100, the packet generation unit in the IC chip 212 generates a packet with its payload size assuming the value of 0 after staying in standby over the second specific length of time. Then, the reader/writer apparatus 200 transmits the packet having been generated from the IC chip 212 to the information communication terminal 100 via the antenna 214 (step S222), so as to switch the data transmission order by giving the next transmission turn to the information communication terminal 100.

The information communication terminal 100 having received the data with a payload size of 0 from the reader/writer apparatus 200 stays in standby over the second specific length of time until it transmits a response (step S224). While the information communication terminal 100 stays in standby over the second specific length of time, new data are transferred from the host device at the reader/writer apparatus 200 (step S226). At this point in time, the information communication terminal 100 is still without any new data, but it is sustaining itself in the state of communication with the reader/writer apparatus 200. Thus, the data verification unit 124 makes a decision as to whether or not there are any data to be transmitted to the reader/writer apparatus 200 and since there are no data to be transmitted to the reader/writer apparatus 200, the packet generation unit 125 generates a packet with its payload size assuming the value of 0 after staying in standby over the second specific length of time. Then, the packet is transmitted to the reader/writer apparatus 200 (step S228), thereby switching the data transmission order by giving the next transmission turn to the reader/writer apparatus 200.

The reader/writer apparatus 200 having received the data with a payload size of 0 from the information communication terminal 100 has data to be transmitted to the information communication terminal 100 and, accordingly, it waits in standby over the first specific length of time before it transmits a response (step S230). Then, when the first specific length of standby time is up, the reader/writer apparatus 200 transmits the data to the information communication terminal 100 (step S232). The payload size of the packet transmitted at this time is not 0.

As described above, when there are no data to be transmitted, the next data transmission turn is given to the communication partner after allowing the specific length of standby time to elapse and, as a result, no uncertainty as to which communication partner should start communication next ever occurs. In addition, if there are no data to be transmitted, the data transmission interval is increased relative to the regular transmission interval so as to minimize the power consumption.

It is to be noted that the information communication terminal and the reader/writer apparatus 200 adopting the wireless communication method may each further include a data accumulating unit where data to be transmitted to the communication partner are temporarily accumulated and a decision as to whether or not to generate a packet the payload size of which is 0 may be made based upon whether or not there are any data accumulated in the data accumulating unit.

In addition, the wireless communication method described above may be implemented in conformance to a computer program stored in the information communication terminal 100 or the reader/writer apparatus 200.

The information communication terminal and the wireless communication method achieved in the third embodiment has been described so far.

As explained above, in the third embodiment of the present invention, if there are no data to be transmitted to the communication partner, blank data are transmitted during data communication carried out by information communication terminals each equipped with a built-in IC chip. In addition, the blank data are transmitted after an increased communication interval. As blank data are exchanged, no uncertainty as to which communication partner should start transmission next occurs. In addition, if there are no data to be transmitted, the data transmission interval is increased so as to minimize the power consumption.

It should be understood by those skilled in the art that various modifications, combinations, sub-combinations and alterations may occur depending on design requirements and other factors insofar as they are within the scope of the appended claims or the equivalents thereof.

For instance, while functions of the identifier appending unit, the interval calculation unit, the data verification unit and the packet generation unit according to the present invention are fulfilled in the IC chips in the embodiments described above, the present invention is not limited to this example. Some or all of these functions may be fulfilled in the controllers or they may be fulfilled in another component of the information communication terminals. As an alternative, all the processing according to the present invention may be executed in the IC chips.

Furthermore, while data are exchanged by an information communication terminal and a reader/writer apparatus in the embodiments of the present invention, the present invention is not limited to this example and it may be adopted in data exchange by information communication terminals each equipped with a built-in IC chip.

What is claimed is:

1. A wireless communication system that includes first and second information communication terminals with built-in IC chips engaged in alternating wireless communication with each other through noncontact communication, wherein: said first information communication terminal includes: a reception unit that receives a packet originating from the second information communication terminal; a transmission unit that wirelessly transmits a plurality of packets to the second information communication terminal by transmitting in succession all packets that can be transmitted to the second information communication terminal continuously in a batch if a specific condition is satisfied; an interval calculation unit that calculates a transmission interval with which the plurality of packets are to be transmitted, based upon communication-related information corresponding to the first information communication terminal and communication-related information corresponding to the second information communication terminal; wherein the transmission unit transmits the plurality of packets continuously in the batch based upon the calculated transmission interval; and an identifier appending unit that appends a last packet identifier to a packet to be transmitted last from said transmission unit among all the packets that can be transmitted to the second information communication terminal continuously, wherein upon receiving a last packet identifier from a transmission unit of the second information communication terminal, the first information communication terminal judges that the last packet from the second information communication terminal signals a timing with which the plurality of packets should be sent to the second information communication terminal without sending an acknowledgement of receipt of packets to the second information communication terminal.

2. A first information communication terminal that engages in alternating wireless communication with a second information communication terminal through noncontact communication achieved by using IC chips, comprising: a reception unit that receives a packet originating from the second information communication terminal; a transmission unit that wirelessly transmits a plurality of packets to the second information communication terminal by transmitting in succession all packets that can be transmitted to the second information communication terminal continuously in a batch if a specific condition is satisfied; an interval calculation unit that calculates a transmission interval with which the plurality of packets are to be transmitted, based upon communication-related information corresponding to the first information communication terminal and communication-related information corresponding to the second information communication terminal; wherein the transmission unit transmits the plurality of packets continuously in the batch based upon the calculated transmission interval; and an identifier appending unit that appends a last packet identifier to a packet to be transmitted last from said transmission unit among all the packets that can be transmitted to the second information communication terminal continuously, wherein upon receiving a last packet identifier from the second information communication terminal, the first information communication terminal judges that the last packet from the second information communication terminal signals a timing with which the plurality of packets should be sent to the second information communication terminal without sending an acknowledgement of receipt of packets to the second information communication terminal.

3. A first information communication terminal according to claim 2, further comprising:
 a storage unit in which parameters related to the first information communication terminal are stored, wherein:
 at a communication start, the first information communication terminal exchanges said parameters with the second information communication terminal and determines the number of packets to be transmitted continuously based upon said parameters.

4. A first information communication terminal according to claim 2, further comprising:
 a storage unit in which parameters related to the first information communication terminal are stored, wherein:
 at a communication start, the first information communication terminal exchanges said parameters with the second information communication terminal and determines the volume of data to be transmitted continuously based upon said parameter.

5. A first information communication terminal according to claim 2, constituted with a portable telephone.

6. A first information communication terminal according to claim 2, constituted with a reader/writer apparatus.

7. A wireless communication method that enables alternating wireless communication between a first information communication terminal and a second information communication terminal through noncontact communication achieved by using IC chips, comprising: a reception step in which a packet from the second information communication terminal is received; a transmission step in which a plurality of packets are wirelessly transmitted by transmitting in succession all packets that can be transmitted to the second information communication terminal continuously in a batch if a specific condition is satisfied; a calculation step that calculates a transmission interval with which the plurality of packets are to be transmitted, based upon communication-related information corresponding to the first information communication terminal and communication-related information corresponding to the second information communication terminal; wherein the plurality of packets are transmitted continuously in the batch based upon the calculated transmission interval; and an identifier appending step in which a last packet identifier is appended to a packet to be transmitted last among all the packets that can be transmitted to the second information communication terminal through said transmission step, wherein upon receiving a last packet identifier from the second information communication terminal, the first information communication terminal judges that the last packet from the second information communication terminal signals a timing with which the plurality of packets should be sent to the second information communication terminal without sending an acknowledgement of receipt of packets to the second information communication terminal.

8. A non-transitory computer readable medium embodied with a program that enables alternating wireless communication between a first information communication terminal and a second information communication terminal through noncontact communication achieved by using IC chips, enabling a computer to execute processing that includes: a reception step in which a packet from the second information communication terminal is received; a transmission step in which a plurality of packets are transmitted by transmitting in succession all packets that can be transmitted to the second information communication terminal continuously in a batch if a specific condition is satisfied; an interval calculation step that calculates a transmission interval with which the plurality of packets are to be transmitted, based upon communication-related information corresponding to the first information communication terminal and communication-related information corresponding to the second information communication terminal; wherein the plurality of packets are transmitted continuously in the batch based upon the calculated transmission interval; and an identifier appending step in which a last packet identifier is appended to a packet to be transmitted last among all the packets that can be transmitted to the second information communication terminal through said transmission step, wherein upon receiving a last packet identifier from the second information communication terminal, the first information communication terminal judges that the last packet from the second information communication terminal signals a timing with which the plurality of packets should be sent to the second information communication terminal without sending an acknowledgement of receipt of packets to the second information communication terminal.

9. A first information communication terminal that engages in alternating wireless communication with a second information communication terminal through noncontact communication achieved by using IC chips, comprising: a reception unit that receives a packet originating from the second information communication terminal; a transmission unit that wirelessly transmits in succession a plurality of packets to the second information communication terminal continuously in a batch if a specific condition is satisfied; an interval calculation unit that calculates a transmission interval with which the plurality of packets are to be transmitted, based upon communication-related information corresponding to the first information communication terminal and communication-related information corresponding to the second information communication terminal; wherein the transmission unit transmits the plurality of packets continuously in the batch based upon the calculated transmission interval; and an identifier appending unit that appends a last packet identifier to a packet to be transmitted last from said transmission unit among said a plurality of packets that are transmitted to the second information communication terminal continuously, wherein upon receiving a last packet identifier from the second information communication terminal, the first information communication terminal judges that the last packet from the second information communication terminal signals a timing with which the plurality of packets should be sent to the second information communication terminal without sending an acknowledgement of receipt of packets to the second information communication terminal.

10. A first information communication terminal according to claim 9, further comprising:
    a storage unit in which parameters related to the first information communication terminal are stored, wherein:
    at a communication start, the first information communication terminal receives said parameters stored in the second information communication terminal from the second information communication terminal and determines the number of packets to be transmitted continuously to the second information communication terminal based upon said received parameters.

11. A first information communication terminal according to claim 9, further comprising:
    a storage unit in which parameters related to the first information communication terminal are stored, wherein:
    at a communication start, the first information communication terminal receives said parameters stored in the second information communication terminal from the second information communication terminal and determines the volume of data to be transmitted continuously to the second information communication terminal based upon said received parameter.

\* \* \* \* \*